Patented Sept. 4, 1945

2,384,074

UNITED STATES PATENT OFFICE 2,384,074

UNSATURATED CARBAMIC ACID ESTERS

Albert G. Chenicek, Barberton, Ohio, assignor to Pittsburgh Plate Glass Company, Pittsburgh, Pa., a corporation of Pennsylvania No Drawing. Application June 16, 1941,
Serial No. 398,317

7 Claims. (Cl. 260—78)

This invention relates to condensation products and to the polymers of such products. In accordance with the present invention, it has been found that desirable products may be secured by condensation of an aldehyde with an unsaturated carbamate or thiocarbamate having the structure $$R_1-Y-C=O$$
$$\quad\quad|$$
$$\quad HN-R_2$$

where $R_1$ is an unsaturated radical, $R_2$ is hydrogen or an organic radical such as hydrocarbon or halo hydrocarbon or aryl or other substituted hydrocarbon radical, and Y may be oxygen or sulphur. These condensation products may be polymerized under conditions capable of polymerizing unsaturated groups in order to produce desirable products.

The invention is particularly related to the carbamates or thiocarbamates of unsaturated alcohols containing up to 10 carbon atoms. Most actively polymerizable materials may be secured from carbamates or thiocarbamates of alcohols containing up to 5 carbon atoms, including propenyl, butenyl, or pentenyl carbamates, for example, the carbamates of allyl, isopropenyl, propargyl, tiglyl, β-ethyl allyl, α-ethyl allyl, methalyl, butadienyl or crotyl alcohols, methyl vinyl carbinol or ethyl vinyl carbinol. In addition, somewhat less actively polymerizable materials may be secured from carbamates of linalol, or cinnamyl alcohol.

The condensation products are obtained by treatment of the carbamates with aldehydes such as formaldehyde, paraformaldehyde, acetaldehyde, butyraldehyde, acrolein, crotonaldehyde, methacrolein, β-ethyl acrolein, furfural, benzaldehyde, glyoxal or compounds capable of acting as aldehydes such as hexamethylene tetra amine.

The reaction is generally conducted in the presence of a mineral acid catalyst such as HCl, $H_2SO_4$, or other strong acid. Substantial quantities of such acids are generally desired and usually about 10 to 15 percent acid based upon the weight of carbamate is suitable. If desired, alkaline catalysts such as ammonia, $Ba(OH)_2$, $Na_2CO_3$, KOH, $K_2CO_3$, $Ca(OH)_2$, NaOH, etc., may be used to form condensation products. The nature of the products obtained is dependent upon the amount of formaldehyde or other aldehyde utilized and to some degree upon the type of catalyst used.

When less than one mole and preferably about one-half mole of aldehyde is used per mole of carbamate, a condensation product which is generally a white crystalline solid is secured. This product is believed to be an N-alkylidene bis (unsaturated carbamate) having the general formula:

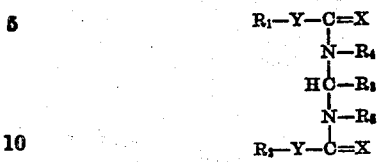

where $R_1$ and $R_2$ are unsaturated radicals, $R_3$, $R_4$ and $R_5$ are hydrogen or an organic radical such as an hydrocarbon or hydrogen substituted hydrocarbon radical or other radical, and X and Y are oxygen or sulphur. The reaction may be effected by mixing the aldehyde and the carbamate, preferably in the presence of an acid catalyst. Heating is generally unnecessary since heat is evolved in the reaction. Cooling may be required in some cases since the reaction is often so vigorous that an excessive temperature is developed and cooling to below 50° C. is essential. The product obtained is washed with water until a neutral product is secured and is thereafter dried by suitable means. The reaction may be conducted in the presence of solvents or diluents such as ethyl or methyl alcohol, ether, benzene, toluene, xylene, etc.

The condensation products, particularly the nonresinous condensation products of carbamates polymerize to form a wide range of polymers varying from soluble fusible products to insoluble infusible polymers. This polymerization may be conducted in the presence of polymerization catalysts capable of polymerizing the unsaturated groups such as oxygen catalysts, including oxygen, ozone, peroxides such as acetone peroxide, benzoyl peroxide, lauryl peroxide, or tetralin peroxide.

Polymers which are very clear, transparent, and hard may be secured. The condensation products may be cast polymerized to form cast polymers of various shapes or intermediate polymers which may be molded may be obtained. These intermediate polymers may be soluble and fusible, or if desired, intermediate polymers having a gel-like structure and containing more or less insoluble polymer may be secured. These polymers may be obtained by interrupting polymerization at the proper time.

In general, the fusible soluble polymers are soluble in various organic solvents such as acetone, carbon tetrachloride, benzene, toluene, xylene, dioxane, etc. Both types of these intermediate polymers may be further polymerized to an infusible state to form products similar to the infusible polymers mentioned above. Thus, these intermediate polymers may be molded or otherwise shaped and polymerized by means of heat and/or light to form shaped products which are substantially infusible and insoluble and which retain their shape permanently.

The soluble fusible polymers herein described may be prepared by polymerizing the unsaturated compounds, preferably in solution or at a temperature above the melting point of normally solid condensation products until substantial polymerization has occurred and interrupting polymerization before the polymer is converted into an infusible polymer preferably while the polymer remains viscous. It is found that when polymerization of these materials is initiated, a fusible polymer is preliminarily formed. As polymerization proceeds, the monomer-polymer mixture is converted into a gel which contains a substantial portion of insoluble polymer. Upon further polymerization of the gel it is further converted to a tougher, more abrasion-resistant polymer which may, in some cases, be substantially infusible. By interrupting polymerization before the polymer is converted to a gel and while the polymer is viscous, it is possible to obtain a fusible polymer. This interruption may be effected by cooling, by addition of inhibitors, or by other methods. If desired, the fusible polymer may be recovered substantially free from monomer or at least as a concentrate containing substantially less monomer than is present in the monomer-polymer mixture formed by ordinary polymerization of undiluted monomer.

The fusible polymer may be obtained by polymerization of the monomeric compound or a solution thereof. In general, it is possible to secure the fusible material in superior yields by polymerizing the monomer in a solution in which the fusible polymer is normally soluble and interrupting polymerization before the polymer is converted into a gel. This polymer is generally soluble in the solvents which are capable of dissolving the usual thermoplastic vinyl or acrylic resins such as polymethyl methacrylate or polyvinyl acetate. Thus, such solvents as acetone, dioxane, chloroform, toluene, benzene, carbon tetrachloride, methyl cellosolve acetate, phenyl cellosolve, dichlorethylether, xylene, tetralin, dibutyl phthalate, trichloroethylene, tetrachlorethane, etc., or mixtures of these solvents generally are found to be suitable. Solutions having concentrations of 10 to 60 per cent of monomer yield very satisfactory results.

In any case the polymerization may be interrupted before the infusible product is produced. This may be accomplished by stopping polymerization as the mixture of monomer and polymer begins to grow viscous and before gel formation occurs. In accordance with one illustrative method of interrupting polymerization, the polymer may be separated from the monomer by convenient methods, for example, by the addition of a compound in which the polymers are normally insoluble, such as methyl or ethyl alcohol, petroleum ether, water and ethylene glycol. This process permits the isolation of the fusible polymer in a substantially pure state and is particularly adapted to use when the materials are polymerized in solution. Polymerization may also be halted by lowering the temperature of the reaction mixture to a suitable degree, for example, to room temperature or below. In accordance with another effective method of interrupting polymerization, inhibitors such as pyrogallol, hydroquinone, aniline, phenylene diamine or sulphur may be added to the polymer during polymerization or before polymerization has been initiated.

In polymerization of the compounds herein contemplated, the time required in order to initiate polymerization and to secure a fusible polymer varies widely in view of slight traces of peroxides or inhibitors which may be present. For this reason, the viscosity of the composition undergoing polymerization is observed and, in general, polymerization is interrupted after the viscosity of the composition has approximately doubled. In many cases, subjection of the compound to polymerization conditions for a period of one-half to two hours is sufficient, although some compounds polymerize somewhat more slowly.

The fusible polymer produced by polymerization of diluted or undiluted monomer may be molded or cast to any desired shape and subsequently cured to the infusible state. In treating many of the materials, however, it is found that if considerable monomer is retained in the polymer, considerable difficulty may be encountered upon curing, in securing complete, or substantially complete polymerization of the residual monomer without formation of undesirable soft products or of products containing cracks, bubbles, and other defects, and accordingly, I have found that in many cases it is desirable to remove all or a portion of such monomer from the polymer prior to curing the polymer to its infusible state. In accordance with one convenient method, the polymer may be separated by addition of a nonsolvent such as water, ethyl or methyl alcohol, glycol, etc. Alternatively, the monomer and/or solvent may be distilled from the polymer under conditions whereby further polymerization is minimized, for example, by distillation in a vacuum, preferably at low temperatures, and/or in the presence of added inhibitors. When the monomer-polymer mixture is semi-solid or solid, the product may be dispersed, or extracted, with a suitable solvent for the monomer in which the polymer is insoluble, such as methyl or ethyl alcohol. Additionally, the polymer and monomer may be separated by dissolving the product in a solvent for both monomer and polymer and adding a nonsolvent to precipitate the fusible polymer.

As previously noted, I have found that upon subjection of these fusible polymers to heating at temperatures somewhat above the softening point thereof, for a sufficient period of time, they are converted into an infusible, insoluble and transparent, hard and wear-resistant product. This conversion is preferably assisted by the incorporation of usual polymerization catalysts such as benzoyl or lauryl peroxide, or other oxygen catalyst.

The resins herein contemplated are capable of use in many fields. Thus, the monomer syrupy polymer or fusible polymer may be used for coating or impregnation of wood, paper, cloth, or other fibrous products and in the production of laminated resinous products. Likewise, shaped products of high transparency may be secured by molding and polymerizing the fusible polymer or by cast polymerizing the monomer or syrupy polymer.

In accordance with a further modification, the polymerization may be conducted until the polymer has been converted to a gel. In such a case, solvents are often omitted and the monomer is cast polymerized to the gel state. In treating compounds which are solid the temperature of polymerization is generally maintained above the melting point thereof. Pressure may be applied to insure fusion of such products. When the polymer has been converted to the gel which contains 20 to 75 percent, and preferably 35 to 60 percent, of insoluble matter, it may be removed from the casting mold and shaped, molded, or otherwise treated and may be further polymerized to a more complete stage of polymerization.

The following examples are illustrative:

Example I 43.3 g. (0.43 mole) of allyl carbamate was mixed with 17.0 g. of 37% aqueous formaldehyde (0.22 mole) and 4.5 cc. of concentrated hydrochloric acid slowly added. The mixture was stirred and cooled until it became almost solid. It was allowed to stand for about one-half hour and was then washed with water. The solid was separated by filtration, washed with water and air dried. The product was a crystalline solid which melted at 95 to 97° C. Upon heating the product with 2 percent benzoyl peroxide at a temperature of 100° C., the product polymerized to form a clear, transparent polymer.

Example II 51.7 (0.45 mole) of methallyl carbamate was mixed with 16.2 g. of 37% aqueous formaldehyde (0.2 mole) and 8 cc. of concentrated hydrochloric acid added slowly while stirring and cooling. A paste of crystals was formed which was treated with water and the solid separated by filtration. After washing and drying, the product was recrystallized from benzene to give a white crystalline solid melting at 92–93° C.

Example III

Methallyl carbamate, 5.7 g. (0.05 mole) was mixed with 1.8 g. (0.025 mole) of methallyl alcohol. Concentrated hydrochloric acid (4.5 cc.) was then added and the solution stirred with cooling. The methallyl alcohol was rapidly isomerized by the acid to isobutyraldehyde which reacted with the carbamate. The white solid which formed was worked up as before to give 3.7 g. of crystals. The melting point of the product was 105–107° C.

Example IV

A 50 percent dioxane solution of the compound prepared in accordance with Example III containing 4 percent by weight of benzoyl peroxide was polymerized by heating at 80–85° C. The viscosity of the solution doubled in 375 minutes. At this time the polymer was separated by precipitation with methanol.

A portion of the material containing 3 percent benzoyl peroxide was heated in a mold at 150–155° C. and 5000 lbs. pressure for 30 minutes. A transparent polymer was secured.

Example V

A solution containing 42 g. of the compound prepared in accordance with Example I was dissolved in 42 g. of dioxane and containing 4 percent benzoyl peroxide was heated at 80–85° C. while stirring. After 105 minutes the viscosity had doubled. The solution was cooled and the polymer separated by adding the solution to methanol.

A portion of the polymer containing 3 percent by weight of benzoyl peroxide was molded at 165° C. and 2000 lbs. pressure for 15 minutes. The product was hard and brittle.

Example VI

A quantity of methylene bis (allyl carbamate) prepared as in Example I was melted in an oven at 100° C. and 5 percent benzoyl peroxide added. The mixture was heated for a few minutes at 100° C. and then placed in an oven at 80–85° C. After 17 minutes the sample had gelled. Further heating gave a hard, yellow solid.

Although the present invention had been described with particular reference to the specific details of certain embodiments thereof, it is not intended that such details shall be regarded as limitations upon the scope of the invention except insofar as included in the accompanying claims.

I claim:
1. N-alkylidine bis (allyl carbamate).
2. N-alkylidine bis (methallyl carbamate).
3. A polymer of N-alkylidine bis (allyl carbamate).
4. A diester of N-alkylidene bis (carbamic acid) and a monohydric unsaturated alcohol having its unsaturation in a straight carbon chain between the second and third carbon atoms from the hydroxyl group.
5. N-methylene bis (allyl carbamate).
6. A polymer of the compound defined by claim 4.
7. A method of preparing N-alkylidene carbamic acid esters which comprises reacting an ester of (a) carbamic acid and (b) a monohydric alcohol having an unsaturated linkage in a straight carbon chain between the second and third carbon atom from the hydroxyl group, with one half mole of an aldehyde per mole of carbamate in the presence of a mineral acid catalyst.

ALBERT G. CHENICEK.